J. J. FRITH.
TOASTER.
APPLICATION FILED FEB. 21, 1908.
903,852.
Patented Nov. 17, 1908.
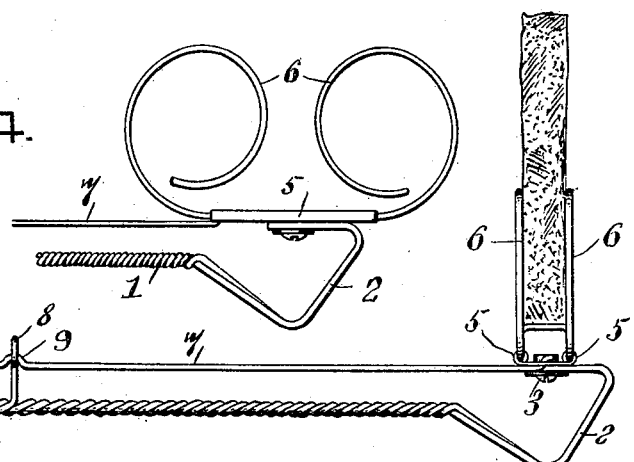
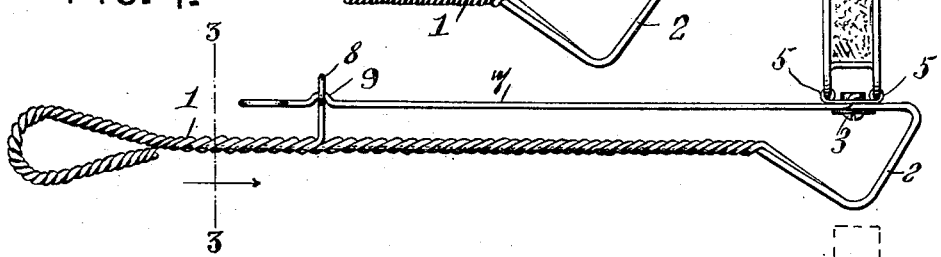
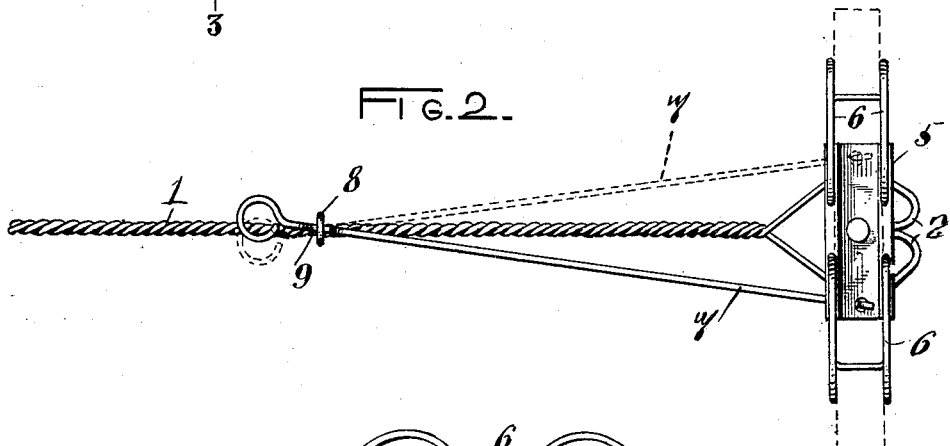
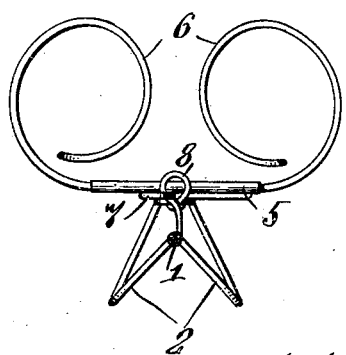
Witnesses:
Eugene M. Sliney
W. S. Babcock
Joshua J. Frith, Inventor,
By Marion & Marion
Attorneys

UNITED STATES PATENT OFFICE.

JOSHUA JEFFERS FRITH, OF BOISSEVAIN, MANITOBA, CANADA.

TOASTER.

No. 903,852.

Specification of Letters Patent.

Patented Nov. 17, 1908.

Application filed February 21, 1908. Serial No. 416,998.

*To all whom it may concern:*

Be it known that I, JOSHUA JEFFERS FRITH, a subject of the King of Great Britain, residing at Boissevain, county of Turtle Mountain, in the Province of Manitoba, Canada, have invented certain new and useful Improvements in Toasters; and I do hereby declare that the following is a full, clear, and exact description of the invention, such as will enable others skilled in the art to which it appertains to make and use the same.

The present invention relates to improvements in toasting devices, and more particularly to such devices as are especially adapted for toasting sliced bread.

Broadly speaking, the invention comprises a handle or other suitable support, a carrier or holder pivotally connected to the support, and means for swinging the carrier into different positions and for reversing the sides of the bread to the fire.

To more clearly disclose the construction, operation and use of the device, reference should be had to the accompanying drawings forming part of the present application.

Throughout the several figures of the drawings similar reference characters designate like parts.

In the drawings:—Figure 1 is a side view of the toaster turned to receive a slice of bread for toasting; Fig. 2 is a plan view of the toaster in the same position; Fig. 3 is an end view looking in the direction of the arrow in Fig. 1, the hand grasp of the handle being broken off; and, Fig. 4 is a side view similar to Fig. 1, but showing the carrier turned in one position for toasting.

Referring to the drawings in detail, 1 represents a handle formed from intertwined and twisted wires which are separated at one end and bent into the form of a supporting yoke 2. This yoke carries a pivot pin or screw 3 on which turns a plate 4 having overturned or rolled edges 5 which embrace and support two substantially parallel looped spring wire members 6 between which the slice of bread may be held. In the preferred form of the device these two members 6 converge slightly toward their upward edges or may be corrugated if desired, in order to increase their holding and gripping action. The loops increase the gripping surface of the members and at the same time add to the spring gripping action thereof, thus insuring a very secure hold on the slice and preventing it from falling out during toasting.

In order to swing the carrier, comprising plate 5 and members 6 about the pivot 3, a rod 7 is pivoted to the plate to one side of the pivotal point thereof and passed through the eye 8 secured to the handle 1.

When placing a slice of bread between the wires 6 for toasting, it is desirable to lock the carrier in a fixed position so that the slice may be more readily inserted. To this end the rod 7 is provided with a bend 9 which is seated over the lower edge of the eye 8, thus preventing movement of the rod and holding the carrier as desired. The dotted lines on Fig. 2 show the rod 7 when the carrier has been swung 180° about its pivot and locked ready for receiving or reversing a slice to be toasted.

In operation, the carrier 4, 5, 6 is swung at substantially right angles to the handle by pushing the rod 7 toward the carrier end of the handle. When the bend 9 reaches the eye 8 it drops over the lower edge of the eye and locks the carrier in position to receive a slice of bread. The slice is now inserted, the rod 7 raised to unseat the bend 9 and moved toward the opposite end of the handle, thus drawing the carrier into the position shown in Fig. 1 for toasting.

It is clear that many changes may be made in the construction and of the several separate parts of the device, many rearrangements of these parts and many other combinations of the several elements may be had without in any way departing from the field and scope of the present invention, and it is meant to include all such within this application, wherein only one preferred form of the same has been shown.

Having thus fully described my invention, what I claim as new and desire to secure by Letters Patent is;

A toaster comprising a handle, a yoke secured thereto, a carrier comprising a plate and parallel members secured to said plate and adapted to receive therebetween a slice, each of said parallel members comprising a single wire having its ends coiled in opposite directions to form circular clamping means, and a straight portion connecting said coils, over-turned or rolled edges on the aforesaid plate adapted to hold said straight portions to said plate, pivotal connections between said carrier and said yoke, a rod secured to said carrier and adapted to swing the same at an angle to the aforesaid handle and provided with a bend, and an eye secured to the said handle and adapted to loosely receive said rod and to coöperate with the bend to lock the carrier in position to receive a slice.

In witness whereof I have hereunto set my hand in the presence of two witnesses.

JOSHUA JEFFERS FRITH.

Witnesses:
N. P. BUCKINGHAM,
F. KENT HAMILTON.